United States Patent
Waznys et al.

(10) Patent No.: US 7,258,288 B2
(45) Date of Patent: Aug. 21, 2007

(54) PROCESS AND APPARATUS FOR COMMINUTING PHYTOSTEROL PARTICLES

(75) Inventors: Peter J. Waznys, Centerport, NY (US); Anthony M. Cialone, Naples, FL (US); George W. Meckert, New York, NY (US)

(73) Assignee: Lehigh Technologies, LLC, Mineola, NY (US)

( * ) Notice: Subject to any disclaimer, the term of this patent is extended or adjusted under 35 U.S.C. 154(b) by 148 days.

(21) Appl. No.: 11/201,597

(22) Filed: Aug. 10, 2005

(65) Prior Publication Data

US 2007/0034722 A1    Feb. 15, 2007

(51) Int. Cl.
*B02C 11/08*    (2006.01)
*B02B 5/02*    (2006.01)

(52) U.S. Cl. .................................... 241/23; 241/65

(58) Field of Classification Search .............. 241/23, 241/24.1, 24.12, 24.16, 65, 77, 78, 79, DIG. 37; 53/523, 127, 436, 440
See application file for complete search history.

(56) References Cited

U.S. PATENT DOCUMENTS 7,093,781 B2 * 8/2006 Meckert et al. .............. 241/23
2005/0107484 A1   5/2005 Waznys et al.

OTHER PUBLICATIONS

U.S. Appl. No. 10/973,847, Peteer J. Waznys et al., filed Oct. 26, 2005.
U.S. Appl. No. 10/973,848, George W. Meckert et al., filed Oct. 26, 2005.

* cited by examiner

*Primary Examiner*—Faye Francis
(74) *Attorney, Agent, or Firm*—Scully, Scott, Murphy & Presser, P.C.

(57) ABSTRACT

A process and an apparatus for the comminution of foodstuff, especially phytosterol, particles to a particle size suitable for inclusion in liquid or solid foods.

31 Claims, 1 Drawing Sheet

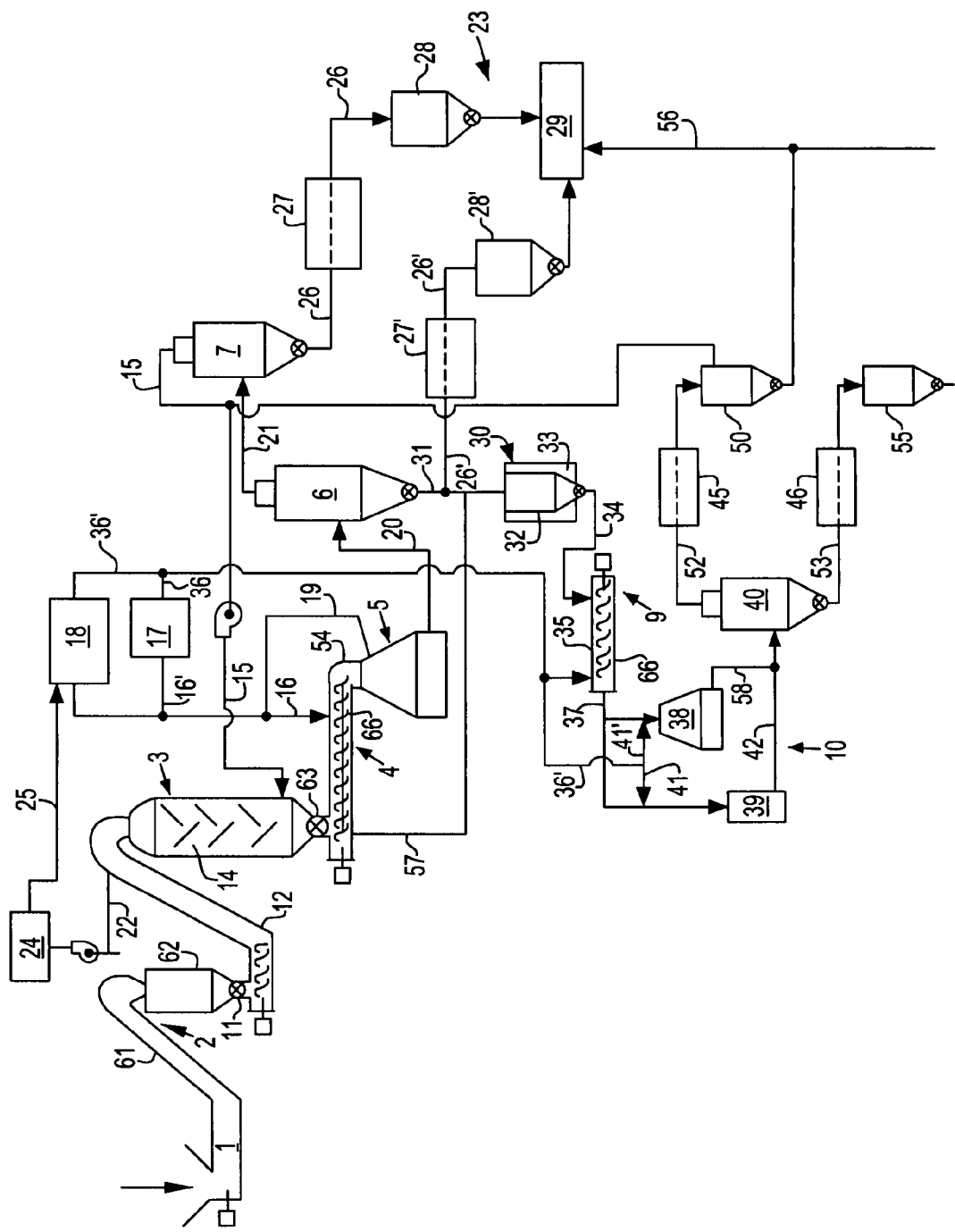

PROCESS AND APPARATUS FOR COMMINUTING PHYTOSTEROL PARTICLES

BACKGROUND OF THE DISCLOSURE

1. Field of the Invention

The present invention is directed to a process and apparatus for comminuting phytosterol particles to a particle size suitable for use as a food additive. More particularly, the present invention is directed to a process and apparatus for comminuting phytosterol in significantly larger amounts and at greater mass velocity than heretofore produced.

2. Background of the Prior Art

Phytosterols, also known as plant sterols, are a naturally occurring class of compounds found in the cells and membranes of plants. These plant lipid-like compounds are present in low levels in grains, fruits and vegetables. There are approximately 250 different sterols and related compounds in plant and marine materials of which the most common abundant are β-sitosterol, stigmasterol and campesterol.

Phytosterols have a similar molecular structure to dietary and endogenously secreted cholesterol. The aforementioned three most common phytosterols differ from cholesterol only in the identity of one side chain or the presence of an extra bond. This molecular similarity between cholesterol and phytosterol molecules result in competition in the human body for absorption in the small intestine. Although phytosterols are absorbed in the small intestine, they are not absorbed into the blood stream. That is, most of the phytosterols ingested by human beings remains in the gastrointestinal tract. Indeed, phytosterol absorption into the body is limited to approximately 2% to approximately 15%, depending on the identity of the phytosterol.

The absorption of phytosterols in the intestine blocks the absorption of dietary cholesterol, which competes with phytosterols for absorption. Moreover, the reabsorption of cholesterol from bile acids in the digestive process in inhibited by phytosterols. As such, the intake of phytosterols inhibits the entrance of cholesterol into the blood stream.

The above description is a simplified explanation of the fact that phytosterols result in lowering of cholesterol levels in the blood stream. Insofar as cholesterol has been identified as a principal cause of heart disease, increase of phytosterols content in the human diet can significantly reduce blood cholesterol levels.

The addition of phytosterols to other foods is an excellent means for increasing phytosterol consumption in the diet. However, the commercially available phytosterol obtained from exploitation of plant products, such as soybean oil extraction, have a particle a size which makes addition of phytosterol, even in small concentration, detectable. That is, the relatively large size of phytosterol particles makes its introduction into liquid or solid foods detectable due to taste, odor and/or texture.

Unfortunately, phytosterol particles are not easily comminuted. This is so because the melting point of a typical phytosterol is in the range of between about 135° F. and 145° F. Thus, phytosterol particles melt, due to the heat of comminution, when phytosterol particles are conventionally ground. Therefore, there is a strong need in the art for a process and an apparatus for comminuting phytosterol particles, without degradation, to a suitably small particle size for non-detectable introduction into foods, in commercially significant volumes, to satisfy the predicted high volume requirements of this product.

The above need in the art for improved comminution of phytosterols is also indicated for other comestibles that are combinable with other foods for easy edibility. Such products as neutraceuticals, for example, Vitamins A, B1, C, D and E, folate and necessary dietary minerals, e.g. potassium, calcium and zinc, sugar substitutes, dietary supplements, food additives, food fortifiers and the like could find wider utility if they could be milled to smaller size for incorporation into other liquid and solid foods. Thus, the need in the art for an apparatus and process for comminuting phytosterol particles is not limited to that utility. Such an apparatus and process is also desired in the comminution of a large class of comestible food products, particularly those necessary for healthy diets.

BRIEF SUMMARY OF THE INVENTION

A process and apparatus has now been developed which provides efficient high volume comminution of phytosterol particles to a small enough particle size to permit its incorporation into a wide variety of liquid and solid foods. This process and apparatus does not degrade any physical or chemical property of the phytosterol particles.

In accordance with the present invention a process and apparatus for comminuting phytosterol particles to a particle size suitable for introduction into liquid or solid foods is provided. The apparatus includes a controlled delivery means for delivering phytosterol having an average particle size in the range of between about 40 microns and about 200 microns under controlled mass velocity. A precooling means, in communication with the controlled delivery means, is provided for precooling the phytosterol particles. Freezing means, in communication with the precooling means, freezes the phytosterol particles to below their glass transition temperature. A comminution means, in communication with the freezing means, comminutes the frozen phytosterol particles. Particle size separation means, in communication with the comminution means, separate the comminuted phytosterol particles into a first steam of phytosterol particles having an average particle size of more than about 25 microns and a second stream of phytosterol particles having an average particle size of less then about 25 microns. Packaging means, in communication with the comminution means, packages the second stream of the phytosterol particles having an average particle size of less than about 25 microns. A secondary freezing means, in communication with the particle size separation means, freezes the first stream of phytosterol particles having an average particle size of more than about 25 microns to below their glass transition temperature by contact with a cryogenic liquid. A secondary comminution means, in communication with the secondary freezing means, comminutes the frozen particles to an average particle size of less than about 25 microns. The packaging means, in communication with the second comminution means, packages the comminuted product.

In further accordance with the present invention a process of comminuting phytosterol particles to a particle size suitable for inclusion in liquid or solid foods is provided. The process includes delivering, at a controlled mass velocity, phytosterol particles having a particle size in the range of between about 40 microns and about 200 microns. The controlled delivered phytosterol particles are precooled. The precooled phytosterol particles are thereupon frozen to below their glass transition temperature. The frozen phytosterol particles are next comminuted. The comminuted phytosterol particles are separated into a first phytosterol particle steam having an average particle size of more than about 25 microns and a second phytosterol particle stream having an average particle size of less than about 25 microns. The second phytosterol particle stream is packaged. The first phytosterol particle size stream is frozen. The frozen first stream of phytosterol particles is then comminuted to an average particle size of less than about 25 microns. The comminuted first stream of phytosterol particles is thereupon packaged for delivery.

BRIEF SUMMARY OF THE DRAWING

The present invention will be better understood by reference to the accompanying drawing, which is a flow diagram of the process and apparatus of the present invention.

DETAILED DESCRIPTION

The process and apparatus of the present invention start with the delivery of phytosterol particle feedstock. The phytosterol particle feedstock is obtained from various sources, principally from plant processors who process various plant products that contain phytosterols. Although phytosterol is obtained from a plurality of plant products, probably the single largest source of phytosterol is soybeans. The extraction of soybean oil products yield phytosterol as a by-product.

Independent of the source of phytosterol particles, that product is usually delivered to the process and apparatus of the present invention in super sacks which contain a half metric ton, e.g. 1100 lbs, or in kraft bags, which contain 50 lbs. of phytosterol particles. Other delivery sizes, although not common, may be provided. The phytosterol particle feedstock is typically characterized by an average particle size in the range of between about 40 and about 200 microns.

The phytosterol particles are unloaded and fed into a feedstock delivery means 1. Delivery means 1 may be provided by a hopper-rotating auger mechanism or the like which permits controlled delivery. That is, a uniform rate of introduction of the phytosterol particles in pounds per unit time, e.g. mass velocity, is provided. Delivery means 1, independent of the apparatus employed to provide this function, is enclosed. This is typical of the entire process and apparatus of the present invention. That is, the process and apparatus of the present invention is a closed system which permits retention of the phytosterol particles feed and cryogenic coolant, infra, to permit maximum yield and most efficient operation of the process. The closed system also prevents contamination of the feedstock. It is furthermore emphasized that all equipment and conduits of the apparatus of the present invention are constructed of stainless steel or other non-corrosible metal to insure purity and human edibility of the phytosterol produced therein.

The phytosterol particle feedstock delivery means 1 is introduced into controlled delivery means 2. Controlled delivery means 2, in a preferred embodiment, includes a feed conduit 61, such as a bucket elevator, in communication with a feed bin 62 provided with control delivery means 11 at its outlet. The controlled delivery means 11 may be a valve which opens and closes in coordination with the desired speed of delivery of phytosterol particles to the downstream end of the apparatus.

The phytosterol particles are conveyed from feed bin 62 to a precooling means 3 by enclosed conduit 12. This conveyance may be effected by an auger, a bucket elevator, a combination thereof or the like. Precooling means 3 is provided by a feedstock precooler, which maximizes surface area per unit volume exposure of the phytosterol particles to a coolant. In a preferred embodiment, the feedstock precooler is a vertically disposed, cylindrically shaped vessel provided with a plurality of baffles or trays 14, which provide deflection of the particles, so as to permit maximum exposure of their surfaces. In this preferred embodiment, the phytosterol particles are charged into the top of the precooler and fall by gravity. It is emphasized that baffles or trays 14 not only disperse the particles in their downward flight, thus increasing surface area exposure, but, in addition, reduce the speed of the downward flight of the phytosterol particles, thereby increasing the throughput time of the particles, maximizing the efficiency of the precooling operation.

A coolant stream, fed through a conduit 15, is introduced into the precooler concurrently with the introduction of the phytosterol particles. Preferably, the coolant stream enters the precooler at or near its bottom to provide countercurrent flow of the coolant stream and the phytosterol particles, which are cooled therein. As those skilled in the art are aware, countercurrent heat transfer is more efficient than other convective heat transfer schemes.

The coolant stream, entering the pre-cooler through conduit 15, is a cryogenic gas, discussed infra, introduced at a temperature no higher than about 0° F. Preferably, the coolant stream is at a temperature of between about 0° F. and about −20° F. More preferably, the temperature of the cooling cryogenic gas stream is about −10° F.

The phytosterol particles precooled in the precooling means to below ambient temperature, preferably to a temperature of about 30° F. to about 40° F., are introduced into a freezing means 4 from the outlet of the precooling means 3. The outlet of pre-cooling means 3 controls the feed rate of the pre-cooled phytosterol particles. A preferred expedient for this control is a rotary discharge valve 63, as illustrated in the drawing. As those skilled in the art are aware, rotary valves control mass velocity of the contents, in this case precooled phytosterol particles.

Freezing means 4, in a preferred embodiment, is a horizontally disposed, cylindrically shaped device supplied with a source of a cryogenic liquid, which enters the freezing means 4 through conduit 16. The source of the cryogenic liquid may be either a liquefaction plant 18, discussed infra, or a large cryogenic liquid storage tank, denoted in the drawing by reference numeral 17. The cryogenic liquid supplied by liquefaction plant 18 or by storage tank 17 is in communication with freezing means 4 by means of insulated conduit 16. Conduit 16 is in direct communication with liquefaction plant 18 and in communication with cryogenic liquid storage tank 17 by means of conduit 16'.

In the preferred embodiment wherein a horizontal cylindrically shaped freezer is employed, the precooled phytosterol particles are moved through the freezer by means of an auger, a metal conveyer belt or the like. The drawing illustrates the preferred embodiment wherein an auger 66 is employed to move the particles through freezing means 4. The phytosterol particles are showered with the cryogenic liquid by means of a manifold, a plurality of nozzles or the like. The drawing depicts the preferred embodiment wherein a manifold 54 is employed for supplying the cryogenic liquid that contacts the phytosterol particles.

The cryogenic liquid employed in freezing the phytosterol particles is an inert fluid which is at cryogenic temperature at approximately ambient pressure. By "inert" is meant that the cryogenic liquid does not chemically react with the phytosterol particles or have any other effect on the phytosterol particles other than to freeze them to below their glass transition temperature. Cryogenic liquids that meet these criteria include noble gases, such as neon, helium, and argon. However, a more preferred cryogenic liquid is nitrogen. Although nitrogen is not more effective than noble gases, it is significantly lower in cost and is more easily available.

The heat transferred from the phytosterol particles, which results in the lowering of their temperature to below the glass transition temperature, provides sufficient heat to vaporize the cryogenic liquid into a cryogenic gas. Indeed, the heat transferred is sufficient to raise the cryogenic gas temperature to significantly above its boiling temperature. However, the temperature of the cryogenic gas, preferably gaseous nitrogen, is still low enough to be an effective coolant.

In this preferred embodiment wherein the cryogenic liquid introduced into freezing means 4 is liquid nitrogen, that liquid enters freezing means 4 at a temperature of about −320° F. Upon contact with the precooled phytosterol particles, the liquid nitrogen is heated by an amount sufficient to exceed the latent heat of vaporization so that the nitrogen is converted to a gas. Sufficient additional sensible heat is absorbed by the gas to raise its temperature to a range of about −140° F. Concurrently, the phytosterol particles are frozen below their glass transition temperature.

To insure that the phytosterol particles are frozen below the glass transition temperature, an adequate supply of cryogenic liquid is introduced into freezing means 4. In addition, the speed of the conveyer means, whether it be an auger, a conveyer belt or the like, is set at a speed slow enough to provide sufficient contact time to effectuate this result.

The phytosterol particles below their glass transaction temperature are in an embrittled vitreous state. The phytosterol particles in this condition are easily shatterable in the solid state. It is in this condition that the phytosterol particles are conveyed directly into a comminution means 5 where they comminuted to a particle size fine enough to be introduced into foods, a size of less than about 25 microns.

It is emphasized that, in addition to the frozen phytosterol particles, the heated cryogenic liquid in the form of a cryogenic gas, is entrained into comminution means 5. Moreover, if required, in a preferred embodiment, a supply of cryogenic liquid, preferably provided by the same source that is employed in freezing the phytosterol particles in freezing means 4, is provided to the comminution means 5. This optional supplemental cryogenic liquid stream enters the comminution means 5 through conduit 19, in the event that an independent source of cryogenic liquid 17 is utilized. Conduit 19, in that preferred embodiment, is provided as a tapoff from conduit 16, which is communication with either liquefaction plant 18 or cryogenic liquid storage tank 17.

Obviously, it is imperative that the phytosterol particles entering comminution means 5 be below the glass transition temperature. The entrainment of gaseous cryogenic fluid from the freezing means 4 into the comminution means 5 aids in assuring this result. However, as stated above, in a preferred embodiment, a supplemental source of cryogenic liquid is introduced into the comminution means 5, along with the cryogenic gas, to make this result more certain.

Although the comminution means 5 may be any comminution apparatus that is capable of reducing the phytosterol particle size to a range of about 25 microns, a particularly preferred embodiment of comminution means 5 is an impact mill which includes a stationary outer casing having a conical shape. Disposed inside the casing is an impact rotor provided with a plurality of impact knives. This impact rotor has a complementary conical shape, which is accommodated within the outer casing, providing a gap therebetween in the form of a conical annular space. This gap is adjustable by lifting or lowering the impact rotor. In addition, the impact rotor is provided with a variable frequency drive. Thus, the rotational speed of the rotor may be controlled. The variability provided by the gap size and the rotational speed of the rotor provides requisite control of the degree of comminution attained.

The comminuted phytosterol particles along with gaseous cryogenic fluid, which includes the gaseous entrained cryogenic fluid as well as the vaporized cryogenic liquid, if present, exits the comminuting means 5 at a temperature in excess of the temperature of the cryogenic gas entering therein, even if supplemented with cryogenic liquid. For example, in the preferred embodiment wherein liquid nitrogen acts as the cryogenic liquid in freezing means 4, the temperature of the cryogenic gaseous coolant entering comminution means 5 is about −140° F. However, the energy required to comminute, expended in the comminution of the phytosterol particles, increases the gaseous nitrogen temperature, even if supplemented by fresh liquid nitrogen, to a temperature of about −40° F.

The complete contents of the comminution means 5, including comminuted phytosterol particles and cryogenic gas, is conveyed, through a conduit 20, to a solid particles separating means 6. In a preferred embodiment an air classifier, in which the contents of the comminution mill is subjected to centrifugal force, separates the heavier, larger particles from the lighter, smaller particles and the even lighter cryogenic gas. The heavier particles, denoted as a first phytosterol particle stream, encompasses phytosterol particles having an average particle size of more than about 25 microns. The lighter particle stream, which entrains the cryogenic gas, is denoted as a second phytosterol particle stream. This second stream includes phytosterol particles having an average particle size of less than about 25 microns.

Those skilled in the art of centrifugal air classifiers are aware of the utility of this apparatus in the separation of different sized solid particles. In accordance with well understood scientific principle, the heavier particles, having an average particle size of more than 25 microns, fall to the bottom of the air classifier. The lighter particles, having an average particle size of less than about 25 microns, along with the gaseous coolant, rise to the top of the air classifier.

Focusing upon the second "lighter" stream of phytosterol particles, those having an average particle size of less than about 25 microns, which includes the gaseous cryogenic cooling stream, that first stream exits the top of the solid particles separating means 6 through an enclosed conduit 21 into an gas-solid separating means 7. The gas-solid separating means 7, in a preferred embodiment, is another air classifier wherein centrifugal force separates the heavier solid stream from the lighter gaseous stream. Gas-solid separating means 7 separates the cryogenic gas, which in a preferred embodiment is gaseous nitrogen, from the second phytosterol particles stream. The cryogenic gas exits from the top of the gas-solid separating means 7 through an enclosed conduit 15.

The cryogenic gas stream is recycled, through conduit 15, back into the precooling means 3, where it acts as a coolant, entering the precooler, preferably at or near the bottom of the vertically disposed precooler, at a temperature below ambient. In the preferred embodiment wherein liquid nitrogen is used in freezing the phytosterol particles, the temperature of the recycled nitrogen gas is about −25° F. As stated earlier, the cooling gas stream in precooling means 3, exits from the top of vertically disposed precooler, the point of entry of the phytosterol particles, to provide countercurrent heat transfer.

In the event that a liquefaction plant 18 is provided, the gas is recycled, through conduit 22, to a bag house 24. The gas is filtered, to remove entrained solid phytosterol particles, and conveyed through conduit 25 to liquefaction plant 18 where it is liquefied, by methods well known in the art, to form a cryogenic liquid. Alternatively, in the absence of a liquefaction plant, the cryogenic gas, exiting through the top of precooling means 3, is conveyed, through conduit 22, albeit now at substantially ambient temperature, to bag house 24. Therein, fugitive particulates are separated from the gas by suitable filtering means. The gas is then vented to the atmosphere.

Returning to the gas-solid separating means 7, which, in a preferred embodiment, is an air classifier, the solid stream, having an average particle size of less that about 25 microns, exits there from at lower than ambient temperature. This stream is therefore warmed to ambient temperature. This is accomplished by heating the phytosterol particle stream that is removed from the gas-solids separating means 7. In a preferred embodiment, this is accomplished by covering conduit 26, which is preferably a pneumatic conveyer, providing communication from gas-solid separating means 7, with a jacket warmer 27. This effectuates raising the temperature of the phytosterol particles in the second phytosterol particle stream to about ambient temperature.

The second phytosterol particle stream at ambient temperature is transferred, through conduit 26, to a packaging means 8. Packaging means 8 includes a storage bin 28. The second phytosterol particle stream in storage bin 28 is fed, under controlled conditions, into plastic lined drums, which are loaded onto pallets for shipment to customers. This operation is illustrated in the drawing by reference numeral 29.

The first phytosterol particle stream of phytosterol particles having an average particle size of greater than about 25 microns exits solid particles separating means 6 through conduit 31, in a preferred embodiment, under controlled and monitored conditions, into a secondary controlled delivery means 30. The controlled delivery means 30 encompasses a storage bin 32 provided with an insulation blanket 33. The purpose of providing storage bin 32 with insulation blanket 33 is to maintain the phytosterol particles at the below ambient temperature at which they are introduced therein. It is emphasized that the temperature of the phytosterol particles in solid particles separating means 6, in the preferred embodiment wherein liquid nitrogen is used, is in the range of about −30° F. Insulating blanket 33, about storage bin 32 of secondary controlled delivery means 30, serves the same function as did precooling means 3, it minimizes the cooling load in the subsequent freezing step.

The first phytosterol particle stream exits the secondary delivery means 30 through conduit 34, under controlled conditions, into a secondary freezing means 9. The secondary freezing means 9, in a preferred embodiment, includes a cylindrically shaped, horizontally disposed vessel, which includes an auger, a conveyer belt or other means for transporting the phytosterol particles. The secondary freezing means 9 also comprises cryogenic liquid supplying means, such as a manifold or a plurality of nozzles, for showering the phytosterol particles with a cryogenic liquid. The drawing illustrates auger 66 and manifold 35. In other words, the secondary freezing means 9, in a preferred embodiment, utilizes the same device as is preferably employed as freezing means 4. As in the case of freezing means 4, the preferred cryogenic liquid is liquid nitrogen.

The cryogenic liquid, which is uniformly dispersed over the phytosterol particles, is supplied from the same source that supplies the cryogenic liquid to freezing means 4. Thus, conduit 36' or conduit 36 provides cryogenic liquid from liquefaction plant 18 or cryogenic liquid source 17, respectively, to secondary freezing means 9.

The temperature profile of the frozen phytosterol particles exiting the second freezing means 9 is the same as that of the particles exiting the primary freezing means 4. Indeed, all temperatures recited earlier in the primary processing of the initial charge of phytosterol particles are emulated in the secondary processing scheme.

The frozen phytosterol particle stream exits the secondary freezing means 9 through conduit 37, which conveys the phytosterol particles, at a temperature below the glass transition temperature, to a secondary comminuting means 10. Secondary comminuting means 10 is provided in the alternative. That is, the frozen phytosterol particles, depending upon the desired final phytosterol particle sized product, are either introduced into an impact mill 38, of the type employed in comminuting means 5, or into a jet mill 39.

Those skilled in the art are aware that a jet mill uses high velocity impact of the particles to be comminuted with each other to produce very fine particles. If the desired average particle size of the secondary phytosterol particle stream is in the range of between about 20 and about 25 microns, the stream is conveyed into impact mill 38. On the other hand, if even finer particles are desired, e.g. in the range of below about 10 microns, jet mill 39 is utilized.

Irrespective of which mill is utilized, a supplemental stream of cryogenic liquid, to maintain the temperature of the particles below the glass transition temperature during comminution in secondary comminution means 10, may be optionally provided. This optional expedient is illustrated in the drawing by the combination of conduit 36' and conduit 41' or 41 providing communication between cryogenic liquid source 17 or liquefaction plant 18 and impact mill 38 and jet mill 39, respectively. It is emphasized that, consistent with efficient operation of the process and apparatus of the present invention, the impact mill and the jet mill may be operated simultaneously, albeit producing phytosterol particles of different particle size ranges.

The comminuted product of either impact mill 38 or jet mill 39 of secondary comminuting means 10 are transported, by means of conduit 58 or 42, respectively, to a secondary solid particles separating means 40. Secondary solid particles separating means 40 is again preferably an air classifier which separates the lower weight finer phytosterol particles from the higher weight larger phytosterol particles. The higher weight, larger particles, which fall to the bottom of secondary solid particles separating means 40, are in communication with a common secondary storage bin 55 by means of conduit 53. Secondary storage bin 55, in turn, supplies this product, under controlled conditions, to packaging operation 29 by communication therewith through conduit 56. In packaging operation 29 the phytosterol particles of the first phytosterol particle stream are packaged into plastic lined drums and disposed on pallets for shipment to customers.

The very fine phytosterol particles, which come off the top of secondary solids separating means 40, are conveyed, by means of conduit 52, to secondary storage bin 50. These very fine particles have an average particle size of about 4 microns. However, prior to entering storage bin 50, the particles are heated by jacket warmer 45 to bring the phytosterol particles to about ambient temperature.

It should be appreciated that cryogenic gas is generated when the cryogenic liquid is introduced into secondary freezing means 9 and optionally into secondary comminution means 10. This gas, generated by the heating of the cryogenic liquid, is separated in the secondary solid particles separating means 40 from the heavier phytosterol particles which exit secondary solid particles separating means 40 through conduit 53. However, the cryogenic gas is unseparated from the finer phytosterol particles exiting from conduit 52. Indeed, the cryogenic gas entrains those finer particles.

For this reason storage bin 50 is provided with means for separating the cryogenic gas in storage bin 40 from the fine phytosterol particle contained therein. This is accomplished by an exhaust pump draining the cryogenic gas out of storage bin 40 into conduit 15 which recycles this gas into precooling means 3. A filter disposed at the mouth of conduit 15 prevents phytosterol particles from entering that conduit.

As stated above, the heavier, albeit still very fine phytosterol particles, which exit secondary solid particles separating means 40, is fed, under controlled conditions, by means of conduit 53, to secondary storage bin 55. Again, the particles conveyed through conduit 53 are heated by a jacket heater 46 to about ambient temperature prior to entering secondary storage bin 55.

It is, of course, apparent that the products of secondary storage bins 50 and 55 are not commonly packaged with the products of secondary storage bins 28 and 28'. Similarly, segregation of different sized phytosterol particles dictate the separate packaging of the phytosterol particles of secondary storage bins 50 and 55. In certain applications however, the products of bins 50 and 55 may be combined so that the very fine particles of these two storage bins are commonly packaged depending upon the needs and requests of the customer.

In another preferred embodiment the process and apparatus of the present invention includes bypassing means for bypassing a portion or all of the first phytosterol particle stream of phytosterol particles having an average particle size of greater than about 25 microns. In this embodiment at least a portion of the first phytosterol particle stream is bypassed through conduit 26' to a storage bin 28'. This stream, hereinafter referred to as a third phytosterol particle stream, is bypassed by a suitable valve or the like (not shown) which bypasses the stream into conduit 26'. This third stream, having an average particle size of more than about 25 microns, is, like the second phytosterol particle stream, heated to about ambient temperature, preferably by jacket warmer 27' surrounding conduit 26'. The warmed third phytosterol particle stream is conveyed, through conduit 26', to storage bin 28'. Storage bin 28', a component of packaging means 8, feeds these particles, under controlled conditions, to packaging operation 29, where the particles are packaged in plastic lined drums and loaded onto pallets for shipment to customers.

In yet another preferred embodiment phytosterol particle recycle means is provided to recycle all or a portion of the first phytosterol particle stream for further comminution. In this embodiment all or a portion of the first phytosterol particle stream is recycled back into freezing means 4 wherein the phytosterol particles having an average particle size of more than about 25 microns are reduced in size to a smaller average particle size, albeit not to the average particle size produced in the secondary processing scheme, described above. This embodiment is facilitated by conduit 57, which is in communication with conduit 31. A valve or other suitable memo (not shown) is employed to recycle all or a portion of the first phytosterol particle stream flowing in conduit 31 to freezing means 4.

The above remarks make it apparent that the process and apparatus of the present invention employ a single packaging means 8 for packaging all the different phytosterol particle size streams. Thus, the third phytosterol particle size stream, like the first phytosterol particle stream and the second phytosterol particle stream, although employing separate controlled delivery storage bins, are packaged into drums and loaded onto pallets at common packaging station 29.

The embodiments given above are provided to illustrate the scope and spirit of the present invention. These embodiments will make apparent, to those skilled in the art, other embodiments and examples. These other embodiments and examples are within the contemplation of the present invention. Therefore, the present invention should be limited only by the appended claims.

What is claimed is:

1. An apparatus for comminuting foodstuff particles selected from the group consisting of phytosterol, neutraceutical, dietary mineral, food additives and food fortifiers particles to an average particle size suitable for inclusion in liquid or solid foods comprising:

controlled delivery means for delivering foodstuff particles having an average particle size in the range of between about 40 microns and about 200 microns, at a controlled mass velocity;

precooling means, in communication with said controlled delivery means, for precooling said foodstuff particles;

freezing means, in communication with said precooling means, for freezing said precooled foodstuff particles to below their glass transition temperature;

comminution means, in communication with said freezing means, for comminuting said frozen foodstuff particles;

particle size separating means, in communication with said comminution means, for separating foodstuff particles having an average particle size larger than about 25 microns from foodstuff particles having an average particle size smaller than about 25 microns;

packaging means, in communication with said particle size separating means, for packaging said foodstuff particles smaller than about 25 microns;

secondary freezing means, in communication with said particle size separating means, for freezing said foodstuff particles larger than about 25 microns to below their glass transition temperature;

secondary comminution means, in communication with said secondary freezing means, for comminuting said frozen foodstuff particles; and said packaging means, in communication with said secondary comminuting means, for packaging said comminuted foodstuff particles having an average particle size smaller than about 25 microns.

2. An apparatus in accordance with claim 1 wherein said foodstuff particles are phytosterol particles.

3. An apparatus in accordance with claim 2 comprising bypassing means, in communication with said particle size separating means, for bypassing all or a portion of said phytosterol particles having an average particle size larger than about 25 microns from said secondary freezing means to said packaging means for packaging said phytosterol particles having an average particle size larger than about 25 microns.

4. An apparatus in accordance with claim 2 wherein said phytosterol particles are frozen in said freezing means and said secondary freezing means by contact with a cryogenic liquid.

5. An apparatus in accordance with claim 4 including recycle means for recycling a cryogenic gas, said cryogenic gas generated in said freezing means by the heating of said cryogenic liquid.

6. An apparatus in accordance with claim 5 wherein said cryogenic gas is recycled into said precooling means wherein it cools said phytosterol particles to below ambient temperature.

7. An apparatus in accordance with claim 5 wherein a cryogenic liquid is introduced into said comminution means concurrent with the introduction of said frozen phytosterol particles.

8. An apparatus in accordance with claim 7 comprising gas solid separating means, in communication with said particle size separating means, for separating said phytosterol particles from said cryogenic gas.

9. An apparatus in accordance with claim 1 wherein said comminuting means is an impact mill, said impact mill comprising a conically shaped stationary outer casing and an impact rotor, provided with a plurality of impact knives, having a complementary conical shape accommodated within said outer casing and providing a conically shaped gap there between.

10. An apparatus in accordance with claim 8 comprising a bag house in communication with said recycle means wherein said cryogenic gas is separated from entrained phytosterol particles and vented to the atmosphere.

11. An apparatus in accordance with claim 8 comprising a bag house in communication with said recycle means wherein said cryogenic gas is separated from entrained phytosterol particles and conveyed to a liquefaction plant for regeneration into a cryogenic liquid.

12. An apparatus in accordance with claim 2 wherein said packaging means includes means to package said phytosterol particles having an average particle size of less than about 25 microns in drums and disposing said drums on pallets.

13. An apparatus in accordance with claim 3 wherein said packaging means includes means for packaging said phytosterol particles having an average particle size of more than about 25 microns in drums and disposing said drums on pallets.

14. An apparatus in accordance with claim 1 wherein said secondary comminuting means comprises an impact mill and a jet mill, alternatively utilized as a function of the desired phytosterol particle size, wherein said jet mill is utilized to produce smaller sized particles than said impact mill.

15. An apparatus in accordance with claim 14 comprising a secondary particle size separating means, said secondary particle size separating means comprising an air classifier, said air classifier in communication with said impact mill and said jet mill for separating larger and smaller sized phytosterol particles.

16. An apparatus in accordance with claim 2 comprising phytosterol particle stream recycling means for recycling all or a portion of said phytosterol particles having an average particle size larger than about 25 microns to said freezing means.

17. A process of comminuting foodstuff particles selected from the group consisting of phytosterol, neutraceutical, dietary, mineral, food additives and food fortifier particles to a particle size suitable for inclusion in liquid or solid foods comprising the steps of:

delivering, under controlled mass velocity, foodstuff particles having an average particle size in the range of between about 40 microns and about 200 microns;

precooling said foodstuff particles having an average particle size in the range of between about 40 microns and about 200 microns;

freezing said precooled foodstuff particles to a temperature below the glass transition temperature;

comminuting said frozen foodstuff particles;

separating said comminuted foodstuff particles into a first foodstuff particle stream of foodstuff particles having an average particle size in the range of more than about 25 microns and a second foodstuff particle stream of foodstuff particles having an average particle size in the range of less than about 25 microns;

packaging said foodstuff particles of said second foodstuff particle stream;

freezing said foodstuff particles of said first foodstuff particle stream to a temperature below the glass transition temperature;

comminuting said frozen foodstuff particles of said first phytosterol particle stream; and packaging said foodstuff particles of said first phytosterol particle stream.

18. A process in accordance with claim 17 wherein said foodstuff particles are phytosterol particles.

19. A process in accordance with claim 18 comprising bypassing all or a portion of said first phytosterol particle stream from said freezing stop to form a third phytosterol particle stream.

20. A process in accordance with claim 19 comprising packaging said third phytosterol particle stream.

21. A process in accordance with claim 18 comprising contacting said precooled phytosterol particles with a cryogenic liquid wherein said phytosterol particles are frozen.

22. A process in accordance with claim 21 comprising introducing a cryogenic liquid during said comminuting of said frozen phytosterol particles.

23. A process in accordance with claim 22 comprising separating a cryogenic gas, generated by vaporization of said cryogenic liquid during freezing and comminuting of said phytosterol particles, from said second phytosterol particle stream.

24. A process in accordance with claim 23 comprising recycling said cryogenic gas to said precooling step, wherein it contacts said phytosterol particles having an average particle size in the range of between about 40 microns and about 200 microns.

25. A process in accordance with claim 23 wherein said cryogenic liquid is liquid nitrogen and said cryogenic gas is gaseous nitrogen.

26. A process in accordance with claim 24 comprising filtering said cryogenic gas, subsequent to said contact with said phytosterol particles having an average particle size in the range of between about 40 microns and about 200 microns, whereby entrained phytosterol particles are removed and said filtered cryogenic gas in vented to the atmosphere.

27. A process in accordance with claim 24 comprising filtering said cryogenic gas, subsequent to said contact with said phytosterol particles having a average particle size in the range of between about 40 microns and about 200 microns, whereby entrained phytosterol particles are removed and said filtered cryogenic gas is recycled to a liquefaction plant where said cryogenic gas is converted into a cryogenic liquid.

28. A process in accordance with claim 18 wherein said freezing of said precooled phytosterol particles comprises showering said phytosterol particles with a cryogenic liquid.

29. A process in accordance with claim 18 wherein said comminuting of said frozen phytosterol particles of said first phytosterol particle stream comprises comminuting said phytosterol particles in alternate comminuting mills.

30. A process in accordance with claim 20 wherein said first, second and third phytosterol particle streams are packaged in drums and said drums are disposed on pallets.

31. A process in accordance with claim 18 comprising recycling all or a portion of said first phytosterol particle stream to said step of freezing said precooled phytosterol particles.

* * * * *